Dec. 22, 1931.   E. KINDERMANN   1,837,871
REFRIGERATING PLANT
Filed June 17, 1929
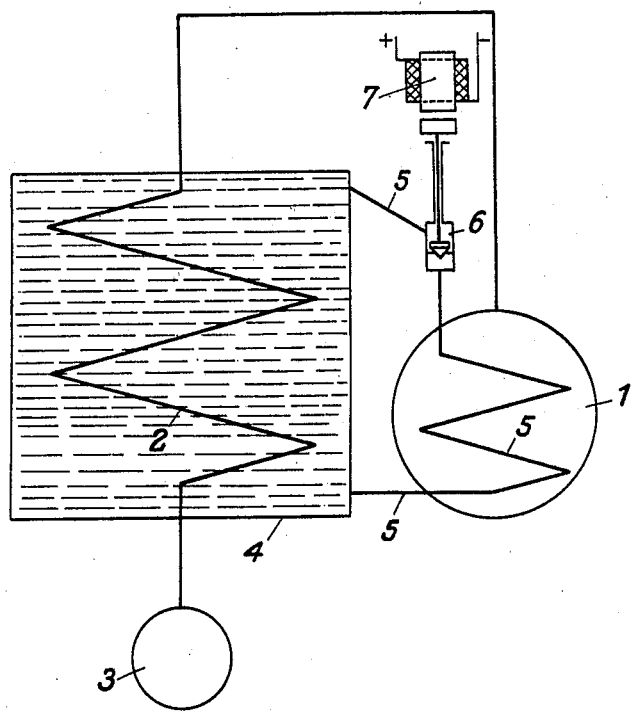
Inventor:
Erich Kindermann
by
Lotka, Kellenbeck & Farley
Attorneys Patented Dec. 22, 1931

1,837,871

UNITED STATES PATENT OFFICE

ERICH KINDERMANN, OF BERLIN-REINICKENDORF-WEST, GERMANY, ASSIGNOR TO DEUTSCHE GASGLUHLICHT-AUER-GESELLSCHAFT MIT BESCHRANKTER HAFTUNG, OF BERLIN, GERMANY, A CORPORATION OF GERMANY

REFRIGERATING PLANT

Application filed June 17, 1929, Serial No. 371,584, and in Germany June 18, 1928.

The present invention relates to a method which will render possible the cooling and condensing of the refrigerant in absorption refrigerating machines working periodically without resorting to the use of flowing water on machines for agitating cooling air or cooling water. The condensation of the refrigerant and the cooling of the absorbing means without the use of percolating water or machines, which will cause the cooling air or water to pass past heat exchanging surfaces, is very difficult since during the period of condensation very large quantities of heat are to be transferred at a small difference of temperature within a short time, while during the heating period the cooling of the generator absorber must be interrupted and again after the termination of the heating period about two-thirds of the total quantity of heat to be transmitted must be transferred in about from 10 to 20 minutes. The intensive cooling of the generator absorber immediately following the heating period is necessary since the temperature of evaporation of the refrigerant in the evaporator is dependent on the pressure of saturation of the remaining solution in the generator absorber. With an absorption machine adapted for the cooling by means of running water, the pressure of saturation of the solution, corresponding to a temperature of evaporation of pure ammonia of minus 10 degrees centigrade, is obtained only, after the temperature of the solution has reached about 40 degrees centigrade. From the fact, that the temperature of the solution after the termination of the heating period amounts to 100 degrees centigrade and more, follows the necessity of the enormous transmission of heat.

This task is solved by the present invention in the manner described hereinafter.

In the drawing one mode of execution of the invention is shown diagrammatically by way of example.

In addition to the customary parts of the apparatus, for instance the generator absorber 1, condenser 2 and evaporator 3, the absorption plant possesses still a further vessel 4 containing a fluid more fully referred to below, in which vessel the condenser 2 is arranged, while the generator absorber is in communication with said vessel 4 through the circulation pipe 5 provided with a valve 6 and a lifting magnet 7. Said vessel 4 together with the liquid contained therein possesses a definite water value, which is so high, that for instance during the absorption of the total amount of heat to be transferred from the machine, a rise of temperature of from 10 to 20 degrees centigrade will occur. On acount of the relatively large surface of said vessel, which can still be increased by means of ribs and the like, the heat absorbed will slowly radiate into the air surrounding the machine.

The transmission of the heat of condensation to the liquid offers no difficulty, since it is possible, as shown, to locate the condenser in the said receptacle. The cooling of the generator absorber, however, can be effected indirectly only, for instance by means of the circulation pipe 5. The interruption of the circulation during the heating period is effected for instance through a valve 6 actuated by a lifting magnet 7. But this cooling by circulating the medium will not suffice to absorb the enormous quantity of heat in such a short time, since the circulation takes place very slowly. Therefore additional means are required for the purpose in question. Now the present invention provides as the contents of the vessel 4, a liquid which will evaporate at the temperature arising during the operation; in other words, the boiling point of the liquid should be below the highest temperature occurring in the operation of the generator absorber. The evaporation of the liquid will assist the cooling effect in two ways. In the first place the heat of evaporation surpassing the specific heat by a multiple is drawn from the generator, and in the second place an increased circulation is obtained through the formation of bubbles and the resulting increase in the difference in weight. Therefore it is not necessary to employ a pure liquid having a low boiling point, but water may be used in which a liquid of low boiling point is dissolved.

I claim:

A periodically operating refrigerating plant of the absorption type having a generator absorber, an evaporator, a condenser interposed between said generator absorber and said evaporator, a cooling pipe in said generator absorber, a tank surrounding said condenser, connections between said tank and said cooling pipe forming a closed circulation path, said tank and circulation path containing a quantity of cooling material for cooling the generator absorber during the absorption period, a valve in the return circuit from the generator absorber to said tank, said valve normally remaining in closed position but being positioned so as to open when the cooling material in the cooling pipe in said generator reaches its boiling point, whereby said cooling material in the cooling pipe in said generator absorber upon reaching its boiling point during the heating period is pressed back into the tank through said valve.

In testimony whereof I affix my signature.

ERICH KINDERMANN.